(12) United States Patent
Bekhor (10) Patent No.: US 7,095,318 B1
(45) Date of Patent: Aug. 22, 2006

(54) ENHANCED VEHICLE ADVISORY SYSTEM TO ADVISE DRIVERS OF OTHER VEHICLES AND PASSENGERS IN THE VEHICLE OF ACTIONS TAKEN BY THE DRIVER

(76) Inventor: Solomon Bekhor, 428 North Hayworth Ave., No. 110, Los Angeles, CA (US) 90048

( * ) Notice: Subject to any disclaimer, the term of this patent is extended or adjusted under 35 U.S.C. 154(b) by 100 days.

(21) Appl. No.: 10/953,821

(22) Filed: Sep. 28, 2004

(51) Int. Cl.
*B60Q 1/50* (2006.01)
(52) U.S. Cl. .................. 340/485; 340/464; 340/465; 362/541
(58) Field of Classification Search ........ 340/459–490, 340/439, 438, 815.41–815.45, 815.53–815.57, 340/815.65–815.68, 815.73–815.77; 362/541, 362/543; 116/28 R, 42, 31, 35 R, 36, 37
See application file for complete search history.

(56) References Cited

U.S. PATENT DOCUMENTS

| 231,108 A | 8/1880 | Schenk | |
|---|---|---|---|
| 4,631,516 A * | 12/1986 | Clinker | 340/464 |
| 4,894,641 A | 1/1990 | Yang | |
| 4,940,962 A | 7/1990 | Sarokin | |
| 5,053,746 A * | 10/1991 | Taneo | 340/473 |
| 5,255,164 A * | 10/1993 | Eidelman | 362/540 |
| 5,373,426 A | 12/1994 | O'Sullivan | |
| 5,426,414 A * | 6/1995 | Flatin et al. | 340/472 |
| 5,652,565 A * | 7/1997 | Salcedas et al. | 340/479 |
| 5,798,691 A | 8/1998 | Kao | |
| 5,905,434 A * | 5/1999 | Steffan et al. | 340/464 |
| 6,211,780 B1 | 4/2001 | Kashefy | |
| 6,300,870 B1 * | 10/2001 | Nelson | 340/468 |
| D451,281 S | 12/2001 | Wodkowski et al. | |
| 6,553,285 B1 * | 4/2003 | Bahmad | 701/1 |
| 6,573,830 B1 | 6/2003 | Cohen | |
| 6,690,272 B1 | 2/2004 | Hall | |

FOREIGN PATENT DOCUMENTS

WO PCT/US01/44124 11/2001

* cited by examiner

*Primary Examiner*—Daniel Wu
*Assistant Examiner*—Jennifer Mehmood
(74) *Attorney, Agent, or Firm*—Thomas I. Rozsa; Tony D. Chen (57) ABSTRACT

A combination vehicle advisory system which consists of a multiplicity of warning lights that are on the front of the vehicle at a location such as above the front bumper and beneath the grill and at a location on the rear of the vehicle such as above the licence plate and on the door of the vehicle, both on the passenger side and the driver side, combined with a window advisory systems comprising a multiplicity of words which are embedded into the front of the front window so they can be read by oncoming traffic, embedded into the rear window so they can be read by traffic following the vehicle embedded into a side window on the driver side of the vehicle so that they can be read by cars on that side of the vehicle, a multiplicity of words embedded into a window on the passenger side of the vehicle so that they can be read by drivers of vehicles of that side of the vehicle, and a multiplicity of words embedded into the interior of the front of the window so that they can be read by passengers in the vehicle.

20 Claims, 2 Drawing Sheets

ENHANCED VEHICLE ADVISORY SYSTEM TO ADVISE DRIVERS OF OTHER VEHICLES AND PASSENGERS IN THE VEHICLE OF ACTIONS TAKEN BY THE DRIVER

BACKGROUND OF THE INVENTION

1. Field of the Invention

The present invention relates to the field of vehicle warning systems which provide a visual display to advise other drivers on the road as to what action the driver of a vehicle is taking.

2. Description of the Prior Art

In general, warning systems to advise other drivers of what a driver of a vehicle is doing have been developed. Most of these systems involve the use of warning lights to signal what a driver is about to do or has just done.

The following ten issued patents or published patent applications are relevant to the field of the invention:

1. U.S. Pat. No. 4,894,641 issued to Yang on Jan. 16, 1990 for "Real-Time Speed Display Apparatus" (hereafter the "Yang Patent");

2. U.S. Pat. No. 4,940,962 issued to Sarokin on Jul. 10, 1990 for "Front Mounted Vehicle Braking Indicator" (hereafter the "Sarokin Patent");

3. U.S. Pat. No. 5,373,426 issued to O'Sullivan on Dec. 13, 1994 for "Front-Mounted Vehicle Brake Light" (hereafter the "O'Sullivan Patent");

4. U.S. Pat. No. 5,798,691 issued to Tim Kao on Aug. 25, 1998 for "Accessory Brake Light System For Automobile" (hereafter the "Kao Patent");

5. U.S. Pat. No. 6,211,780 B1 issued to Kashefy on Apr. 3, 2001 for "Dynamic Traffic Light" (hereafter the "Kashefy Patent");

6. U.S. Pat. No. D451,281 S issued to Bernier on Nov. 27, 2001 for "Front Bumper Brake Light" (hereafter the "Bernier Patent");

7. U.S. Pat. No. 6,573,830 B2 issued to Cohen on Jun. 3, 2003 for "Progressive Brake Light System" (hereafter the "Cohen Patent");

8. United States Patent No. US 2003/0231108 A1 issued to Welch on Dec. 18, 2003 for "Vehicle Movement Warning Light System" (hereafter the "Welch Patent");

9. U.S. Pat. No. 6,690,272 B2 issued to Hall on Feb. 10, 2004 for "Front Safety Light For Alerting Braking Conditions OF A Vehicle" (hereafter the "Hall Patent");

10. PCT Application No. PCT/US01/44124 filed on Nov. 6, 2001 for "Method And Apparatus Used For Installation And Operation Of A Front Vehicle Brake Light" (hereafter the "'44124 PCT Application").

The Yang Patent discloses a real-time speed display apparatus for displaying vehicle speed with different colors of light which has a speed detector for detecting the speed of revolution of the transmission shaft of a vehicle and outputting a speed signal with its pulse rate varied as a function of the revolution speed. The invention involves a real-time speed display apparatus for displaying the speed of a vehicle with lights of different colors comprising detection means for detecting the speed of the vehicle and outputting a speed signal; control means coupled to the detection means for generating a display control signal in response to the speed signal; and display means coupled to the control means for generating light of different colors in response to the display control signal. The detection means also comprises a brake detector connected to the brake pedal of the vehicle, to generate a predetermined control signal to the display means upon detection of the use of the vehicle's brake pedal. Upon receipt of the predetermined control signal, the display means will generate a red light.

The Sarokin Patent deals with a front mounted vehicle braking system. The lights are in the front of the vehicle. The invention involves a braking indicator for vehicles which provides an indication from the front of the vehicle. By way of example referring to Column 2, beginning on Line 23, the invention discloses "an initial depression of the brake pedal results in movement of the pin into the first detent thereby completing an electrical circuit from the vehicle battery through the first contact to the first front mounted brake light thereby providing an indication to vehicles or pedestrians in front of the vehicle that the vehicle's brakes have been initially applied. Further, depression of the brake pedal beyond the initial brake depression moves the pin into the second detent thereby completing a circuit through a second contact between the vehicle battery and the second brake light indicator. This activates a second brake light indicator to provide an indication to vehicles and pedestrians in front of the vehicle that the vehicle brakes have been depressed further beyond a light depression or initial brake depression.

The O'Sullivan Patent discloses a vehicle brake light signal for alerting pedestrians or other vehicle drivers positioned in front of a vehicle to a deceleration of the associated vehicle. The device includes a signal assembly which may be secured to a front area of the vehicle. The signal assembly is electrically coupled to both the brake lights of the vehicle and the variable rate flasher. Upon a depression of the brake pedal of the vehicle, the signal assembly will illuminate or flash to warn others of the vehicle's deceleration. Alternative embodiments of the invention involve a variable aperture assembly controlled by a deceleration sensor for varying the intensity of the signal assembly as a function of the vehicle's deceleration. As you can see, in this case it is located in the center of the vehicle as opposed to underneath the headlights as in the previous patent.

The Kao Patent which issued in 1998 also discloses an accessory brake light system for an automobile is located on the grill. An objective of the invention is to provide an accessory brake light system for automobiles that can provide various kinds of warning signals to point out the braking conditions of the automobile for vehicles or pedestrians positioned in front of the vehicle. The device as disclosed comprises specific warning signals when the automobile is braking to slow down or fully stop in order to enable other vehicles or pedestrians that are positioned in front of the vehicle to be clearly aware of whether the driver of that vehicle is prepared to stop or not and hence reduce the chance of an accident from happening.

The Kashefy Patent discloses a lighting system is on the back of the vehicle but it has a sequence of lights with various logical steps so that cars following the vehicle can know exactly the nature of the way the vehicle is braking. The vehicle signaling display device is mounted on an automotive vehicle, so that signaling lights of the device are visible for drivers of following vehicles. They include orange or amber, red and green lights and includes a system specifically designed to count speed sensor pulses for measuring speed of any vehicle of any make and model on which the device is installed for controlling the signaling lights in accordance with the speed of the vehicle so that the device turns certain sequence colors to tell following drivers how fast the vehicle is going and whether it is slowing down.

The Bernier Patent is a design patent which is entitled "FRONT BUMPER BRAKE LIGHT" and as disclosed in FIG. 6, the front bumper brake light is shown above the grill on the front bumper. Therefore, the concept of having a front bumper brake light is shown in this design patent.

The Cohen Patent shows the concept of having different lighting sequences to illustrate different speeds of the vehicle and what the driver is doing. The brake lights are in the back of the vehicle and not the front. The progressive vehicle brake light system consists of a brake sensor arranged to sense the travel of a brake pedal and the brake light display arrangement to illuminate or extinguish in sequence or progressively in response to the travel of the brake pedal. The brake light display consists of a row of light emitting diodes which are arranged to illuminate from the opposite ends toward the middle as the brake pedal is depressed and to extinguish in reverse sequence when the brake pedal is released.

Welch discloses a vehicle provided with front warning lights adjacent to the front corners of the vehicle. When the vehicle's brake is released, the lights adjacent to the front corner flash red to warn that the vehicle is about to move or has begun to move. A release of the brake pedal deactivates the rear brake lights and completes electrical circuits to activate the red front warning lights. Optionally, a set of green lights can be added to the system to flash green when the vehicle is stopping or when the vehicle has stopped, thereby signaling to other vehicles at an intersection that those vehicles could safely cross in front of the vehicle until the front warning lights change from green to red.

The Hall Patent is a front safety light for alerting braking conditions of a vehicle. As illustrated in FIG. 1, the numerous different locations in the front of the vehicle show the braking system in the front. The invention involves an accessory brake light system for a vehicle comprising a secondary brake light attached to a front of the vehicle. A power source is provided for supplying power to a primary brake light. The primary brake light is attached to the rear of the vehicle. A switch connects the power to the primary brake light when the brake is engaged by an operator which causes the primary brake light to illuminate. A delay mechanism is provided which is capable of determining a delay period after the brake is engaged and the power is connected to the secondary brake light after the delay period thereby illuminating the secondary brake light.

The WIPO Patent discloses a method and apparatus used for installation and operation of a front vehicle brake light. The method discloses using the existing brake light circuitry installed within a vehicle to energize an additional apparatus, such as a front vehicle brake light without adding any components other than one jumper cable which when installed, causes the additional light to illuminate simultaneously with the rear brake lights when the vehicle brakes are applied, so as to notify pedestrians or other drivers viewing from the front of the vehicle that the host vehicle is in a braking mode.

While the prior art discloses warning systems which include a sequence of lights, there is a significant need for an improved advisory system to advise drivers of other vehicles and passengers within the vehicle being driven as to the moving or stopping condition of the vehicle at any given time.

SUMMARY OF THE INVENTION

The present invention is a combination vehicle advisory system which consists of a multiplicity of warning lights that are on the front of the vehicle at a location such as above the front bumper and beneath the grill and at a location on the rear of the vehicle such as above the licence plate and on the door of the vehicle, both on the passenger side and the driver side, combined with a window advisory system comprising a multiplicity of words which are embedded into the front of the front window so they can be read by oncoming traffic, embedded into the rear window so they can be read by traffic following the vehicle, embedded into a side window on the driver side of the vehicle so that they can be read by cars on that side of the vehicle, a multiplicity of words embedded into a window on the passenger side of the vehicle so that they can be read by drivers of vehicles of that side of the vehicle, and a multiplicity of words embedded into the interior of the front of the window so that they can be read by passengers in the vehicle. The words on the window advisory system can be digital letters and also can be backlit so they will be visible in darkness.

The light advisory system and the word advisory system are all electrically connected to the brake, the turn signal and controlled by a computer so that they are in a coordinated sequence. Accordingly, when a certain action is taken by the driver such as pressing on the brake to slow down, the words "SLOWING DOWN" will light up on all of the window advisory systems, the lights will light a certain color and flash a certain sequence to correspond to the words to advise all cars on all sides and front and back of the vehicle as well as the passengers of the vehicle what is happening.

It has been discovered according to the present invention that if a word advisory system which consists of a multiplicity of words including STOP, HELP, SLOWING DOWN, LEFT TURN, RIGHT TURN, REVERSE and U-TURN are embedded into the front window, the rear window, a side window on the driver side of the vehicle, a side window on the passenger side of the vehicle and on the interior of the vehicle so that it can be read by passengers, and such words are electrically connected either by a hard wire connection or by a wireless connection to the braking system and the turn signal system of the vehicle, then when a driver of a vehicle takes a certain action, cars on the front, the back, both sides of the vehicle and the passengers in the vehicle will know what the driver is doing so that they can plan for an appropriate course of action and accidents will be avoided.

It has further been discovery, according to the present invention, that if a light advisory system consisting of a series of lights located on the front of the vehicle, the rear of the vehicle and on the doors on either side of the vehicle, are also electrically connected to the braking system and the turn signal system and further coordinated with the light advisory system so that the lights will light a certain color and either remain solid or flash a certain sequence to correspond to the words, then in addition to words advising all oncoming, following, side traffic and passengers, the light system will also advise all oncoming, following, and side traffic as to what is happening with the vehicle so that there is a coordinated warning system to advise other traffic as to what the driver is going to do.

It has additionally been discovered, according to the present invention, that if a multiplicity of dots are painted onto the tires of the vehicles, then if the dots are visible, it is clear that the vehicle has stopped and if the dots are a blur, then it is clear that the vehicle is moving and if the dots are a slight blur, then it is clear that the vehicle is slowing down.

It has additionally been discovered, according to the present invention, that if a multiplicity of radial lines are painted on the tires and the tire plate cover and lines are cross-printed on the tire treads, then if the lines are visible, it is clear that the vehicle has stopped and if the lines are a blur, then it is clear that the vehicle is moving and if the lines are a slight blur, then it is clear that the vehicle is slowing down.

It has also been discovered, according to the present invention, that if the vehicle is stopped, the addition of a solar panel on the roof of the vehicle connected to the battery so that the battery will not be drained will help assure that the warning system will remain operative even when the vehicle is stopped for an extended period of time.

It has further been discovered, according to the present invention, that the use of lighted words to advise other drivers of what the driver of the vehicle is doing gives other drivers an immediate clear message which other drivers will immediately understand so that they can immediately take the correct responsive action.

It is therefore an object of the present invention to combine a warning system which consists of a multiplicity of lighted words combined with a multiplicity of sequenced lights, all electrically connected to the braking system and turn signal system of the vehicle and coordinated by a computer so that the lights will flash a desired sequence of colors and light flashing conditions combined with the lighted words which are coordinated with the lights so that all traffic on all sides and front and back of the vehicle and passengers will know exactly what the condition of the vehicle is at any given time so that they can take appropriate corrective action.

It is a further object of the present invention to combine additional warning systems such as dots or lines painted on the tires to further advise traffic as to the condition of the vehicle.

It is another object of the present invention to provide a system such as a solar panel so that the battery will not be drained and the light advisory system and word advisory system will remain operative even when the vehicle is stopped over an extended period of time so that the battery will not be drained.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is an improved vehicle advisory system which provides a multiplicity of advisory mechanisms including a sequence of lights, advisory words, and markers on the vehicle tires so that drivers of other vehicles, whether they are in front of, behind, or on either side of the vehicle, will know what the driver of the vehicle is doing or the condition of the vehicle and passengers within the vehicle will also be advised as to what is about to happen or has happened to the vehicle they are riding in.

The prior art disclosed various light warning systems which are incorporated into the braking system of the vehicle to advise drivers both in front of and behind the vehicle whether the vehicle has stopped or is moving. However, it has been discovered that a driver of an oncoming vehicle or a vehicle following the given vehicle may not react quickly enough to just a set of colored lights and also may not know or understand what the various colored lights or sequence of colored lights means. The present invention solves this problem by providing a multiplicity of selected words on the front, back and sides of the vehicle so that all drivers at any location relative to the vehicle will know what is happening with the given vehicle and passengers riding in the vehicle will also be advised. In this way, other drivers will not have to guess what the driver of a vehicle is doing or is about to do. In this way, accidents, especially at intersections, will be avoided.

Referring to FIGS. 1 through 4, the vehicle 10 will have the following selected advisory systems. There is a front window advisory system 20 embedded into the front windshield 12. While shown at the top of the windshield, the words can be at any location on the windshield including the bottom of the windshield. The front window advisory system 20 comprises a multiplicity of words such as STOP, HELP, SLOWING DOWN, LEFT TURN, RIGHT TURN, REVERSE and U-TURN which can be located anywhere on the front window. The words of the front window advisory system 20 can be viewed from the front of the vehicle 10 so that drivers of oncoming traffic can read them. In addition, there is a rear window advisory system 30 embedded into the rear window 32. The rear window advisory system 30 also comprises a multiplicity of words such as STOP, HELP, SLOWING DOWN, LEFT TURN, RIGHT TURN, REVERSE and U-TURN which can be located anywhere on the rear window such as top, bottom or middle of the windshield. The words of the rear window advisory system 30 can be viewed from the rear of the vehicle 10 so that drivers of following traffic can read them. Optionally, the rear window can also have the words DO NOT TAILGATE, KEEP DISTANCE which at the driver's option can be activated by a special button on the dashboard.

Figure 1:
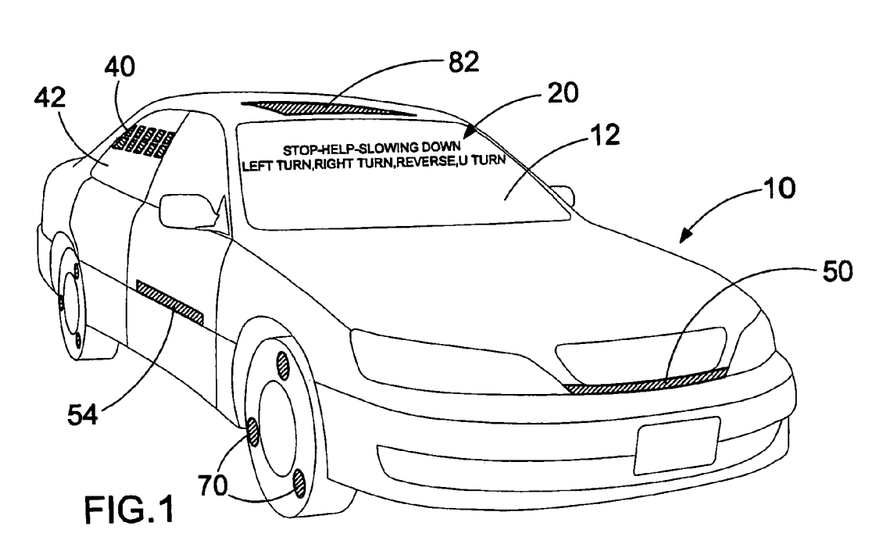
FIG. 1 is a front perspective view of a vehicle embodying portions of the present invention vehicle advisory system.

In addition, there is a side window advisory system. One side window advisory system 40 illustrated in FIG. 1 is shown in greater detail in FIG. 4. The side window advisory system 40 is embedded into a side window 42 of the vehicle 10. The side window advisory system 40 also comprises a multiplicity of words such as STOP, HELP, SLOWING DOWN, LEFT TURN, RIGHT TURN, REVERSE and U-TURN which can be located anywhere on a side window. The words of the side window advisory system 40 can be viewed from the passenger side of the vehicle so that drivers on that side of the vehicle can read them. Similarly, there is a corresponding side window advisory system 46 embedded into a side window 48 of the vehicle 10 on the driver's side of the vehicle so that drivers in other vehicles on that side of the vehicle can view the words of that side window advisory system 46.

The words on all of the window advisory systems can be lighted words or digital words.

Figure 2:
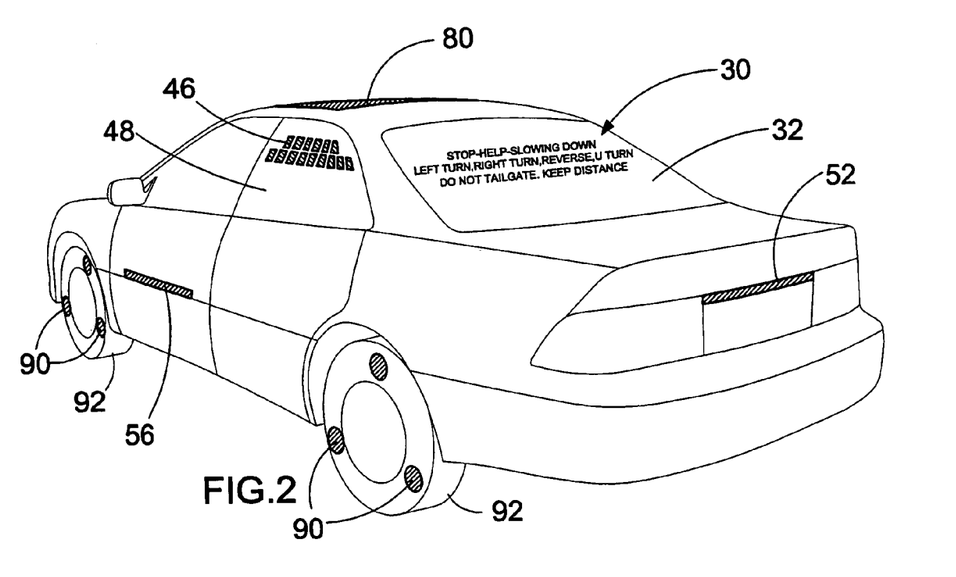
FIG. 2 is a rear perspective view of a vehicle embodying portions of the present invention vehicle advisory system.

In addition, the vehicle will have a front light advisory system 50 located in the front of the vehicle such as beneath the grill and above the front bumper as illustrated in FIG. 1, a rear light advisory system 52 located in the rear of the vehicle such as above the driver's license plate, a first side light advisory system 54 located on one side of the vehicle (see FIG. 1), and a second side light advisory system 56 located on the opposite side of the vehicle (see FIG. 2). Each light advisory system will have a series of selected lights to correspond to the words of the window advisory systems 20, 30, 40 and 46. The lights of the light advisory system can be solid lights, flashing lights, or lights that move from one side to the other or up and down.

By way of example only, the following chart illustrates one possible set of corresponding words of the window advisory system and lights of the light advisory system.

| Words of Advisory System | Corresponding Light Of Light Advisory System | Nature of Light of Light Advisory System |
| --- | --- | --- |
| STOP | RED | SOLID RED |
| HELP | PURPLE | FLASHING UP AND DOWN |
| SLOWING DOWN | YELLOW | FLASHING SIDE TO SIDE |
| LEFT TURN | GREEN | FLASHING SEQUENTIALLY TO THE LEFT |
| RIGHT TURN | BLUE | FLASHING SEQUENTIALLY TO THE RIGHT |
| REVERSE | ORANGE | FLASHING UP AND DOWN |
| U-TURN | VIOLET | FLASHING UP AND DOWN |

It will be appreciated that this is just one set of corresponding words, colors and ways the colors are presented. A standard set of corresponding words, colors and color signals must be developed so that the set is standardized for all vehicles.

The words of the window advisory systems 20, 30, 40 and 46 and the colors and sequencing of the colors of the light advisory systems 50, 52, 54 and 56 will be electrically connected to the braking system and to the turn signal system of the vehicle and controlled by a computer so that the current words will be illuminated and light color and sequence will be displayed when the driver presses on a brake, moves a turn signal or if the vehicle is stopped. the words of the window advisory systems 20, 30, 40 and 46 can also be backlit to be more visible in darkness. In addition, the driver can have an activation panel 80 on the dashboard (see FIG. 3) to press the correct button to activate the words and the lights as well as activate the words DO NOT TAILGATE, KEEP DISTANCE on the rear window advisory system.

Figure 3:
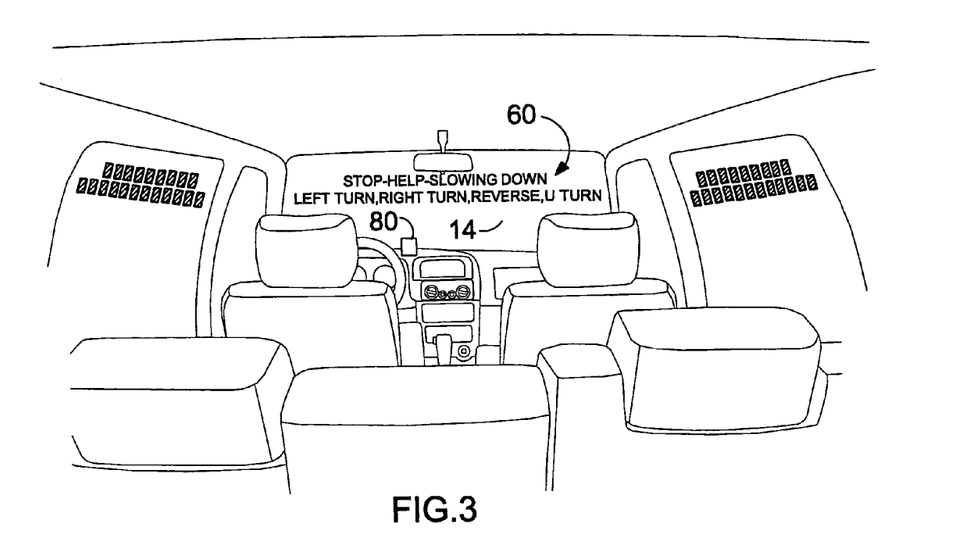
FIG. 3 is perspective view when viewed from inside the vehicle, embodying portions of the present invention vehicle advisory system.
Figure 4:
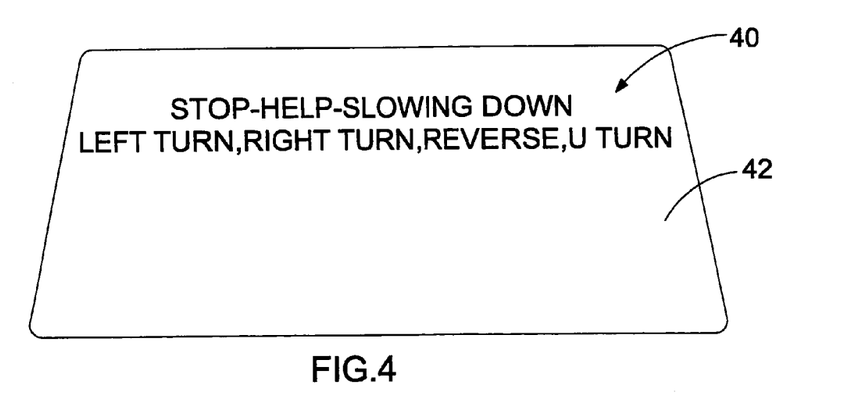
FIG. 4 is a is side view of a vehicle side window embodying portions of the present invention vehicle advisory system.

As illustrated in FIG. 3, another improvement of the present invention is to have an interior window advisory system 60 embedded on the interior 14 of the front windshield 12. The interior window advisory system 60 also comprises a multiplicity of words such as STOP, HELP, SLOWING DOWN, LEFT TURN, RIGHT TURN, REVERSE and U-TURN. The words of the interior window advisory system 60 can be viewed by the passengers in the vehicle so that the passengers will know exactly what is happening in the vehicle they are riding in including bracing themselves for a stop. The interior window advisory system is also connected to the brake and the turn signal and also will have a corresponding button on the dashboard for the driver to push. All of the systems can be hard wired or be a wireless connection through a conventional frequency signal connected by computer to the brake, turn signal and pushbuttons on the dashboard.

To help provide energy, especially if the vehicle is stopped so that the battery may be changed, a solar panel 82 can be located on the roof of the vehicle as illustrated in FIGS. 1 and 2 and connected to the vehicle's battery.

Finally, a multiplicity of marker bright dots 70 as illustrated in FIG. 1 can be painted on the tires. If the dots are visible, other drivers will know that the vehicle is stopped. If the dots blur into a circle, other drivers will know that the vehicle is moving. In case of in-between conditions, other drivers will know that the vehicle is slowing down.

Alternatively, the markings can be a multiplicity of lines which are radial lines painted on the tire and the hub cap and lines 92 painted across the tire tread, as illustrated in FIG. 2. If the lines are visible, other drivers will know that the vehicle is stopped. If the lines are a blur, other drivers will know that the vehicle is moving. In case of in-between conditions, other drivers will know the vehicle is slowing down.

Through use of the present invention advisory system, the driver can let other drivers of other vehicles all around his vehicle know exactly what he intends to do and will let his passengers know exactly what the driver intends to do. In this way, other drivers will not have to guess what the driver intends to do so that other drivers can take appropriate action to avoid accidents and the passengers can brace themselves for what is about to happen.

While the present invention advisory system has been shown incorporated into a passenger vehicle, it will be appreciated that the present invention can be incorporated into a vehicle such as a sports utility vehicle (SUV), a truck and any commercial vehicle such as a bus.

Defined in detail, the present invention is a vehicle advisory system, the vehicle having a front window, a rear window, side windows, a front bumper and grill, a rear lid, a dashboard, a braking system, a turn signal system and tires, the vehicle advisory system comprising: (a) a front window advisory system embedded into the front window, the advisory system having a multiplicity of words which are STOP, HELP, SLOWING DOWN, LEFT TURN, RIGHT TURN, REVERSE and U-TURN, with the words readable from the front of the vehicle so that drivers of oncoming traffic can read them; (b) a rear window advisory system embedded into the rear window, the advisory system having a multiplicity of words which are STOP, HELP, SLOWING DOWN, LEFT TURN, RIGHT TURN, REVERSE, U-TURN, DO NOT TAILGATE, KEEP DISTANCE, with the words readable from the rear of the vehicle so that drivers of vehicles behind the vehicle can read them; (c) a first side window advisory system embedded into a side window on the driver's side of the vehicle, the advisory system having a multiplicity of words which are STOP, HELP, SLOWING DOWN, LEFT TURN, RIGHT TURN, REVERSE and U-TURN, with the words readable from outside of the vehicle on the driver's side of the vehicle; (d) a second side window advisory system embedded into a side window on the passenger side of the vehicle, the advisory system having a multiplicity of words which are STOP, HELP, SLOWING DOWN, LEFT TURN, RIGHT TURN, REVERSE and U-TURN, with the words readable from outside of the vehicle on the passenger side of the vehicle; (e) an interior window advisory system embedded on the interior of the front window; the advisory system having a multiplicity of words which are STOP, HELP, SLOWING DOWN, LEFT TURN, RIGHT TURN, REVERSE and U-TURN, with the words readable by passengers inside the vehicle; (f) a front light advisory system located in the front of the vehicle beneath the grill and above the front bumper, the advisory system having a series of selected lights which will light a certain color and either remain a solid light or a flashing light, the colors and light condition designed to correspond to the words of the window advisory systems; (g) a rear light advisory system located on the rear of the vehicle above the driver's license plate, the advisory system having a series of selected lights which will light a certain color and either remain a solid light or a flashing light, the colors and light condition designed to correspond to the words of the window advisory systems; (h) a first side light advisory system located on a door on the driver's side of the vehicle, the advisory system having a series of selected lights which will light a certain color and either remain a solid light or a flashing light, the colors and light condition designed to correspond to the words of the window advisory systems; (i) a second side light advisory system located on a door on the passenger side of the vehicle, the advisory system having a series of selected lights which will light a certain color and either remain a solid light or a flashing light, the colors and light condition designed to correspond to the words of the window advisory systems; (j) the words of the window advisory systems and lights of the light advisory systems electrically connected to the braking system and to the turn signal system of the vehicle and controlled by a computer so that the correct words will illuminate and the light color and sequence will be displayed when the driver presses on the brake, activates the turn signal, or if the vehicle is stopped; and (k) an activating panel on the dashboard with buttons corresponding to the words of the window advisory systems and light sequence of the light advisory systems.

Defined broadly, the present invention is vehicle advisory system, the vehicle having a front window, a rear window, side windows, a front bumper and grill, a rear lid, a dashboard, a braking system, a turn signal system and tires, the vehicle advisory system comprising: (a) a front window advisory system embedded into the front window, the advisory system having a multiplicity of advisory words, with the advisory words readable from the front of the vehicle so that drivers of oncoming traffic can read them; (b) a rear window advisory system embedded into the rear window, the advisory system having a multiplicity of advisory words, with the advisory words readable from the rear of the vehicle so that drivers of vehicles behind the vehicle can read them; (c) a first side window advisory system embedded into a side window on the driver's side of the vehicle, the advisory system having a multiplicity of advisory words, with the advisory words readable from outside of the vehicle on the driver's side of the vehicle; (d) a second side window advisory system embedded into a side window on the passenger side of the vehicle, the advisory system having a multiplicity of advisory words, with the advisory words readable from outside of the vehicle on the passenger side of the vehicle; (e) an interior window advisory system embedded on the interior of the front window; the advisory system having a multiplicity of advisory words, with the advisory words readable by passengers inside the vehicle; (f) a front light advisory system located in the front of the vehicle, the advisory system having a series of selected lights which will light a certain color and either remain a solid light or a flashing light, the colors and light condition designed to correspond to the words of the window advisory systems; (g) a rear light advisory system located on the rear of the vehicle, the advisory system having a series of selected lights which will light a certain color and either remain a solid light or a flashing light, the colors and light condition designed to correspond to the words of the window advisory systems; (h) a first side light advisory system located on the driver's side of the vehicle, the advisory system having a series of selected lights which will light a certain color and either remain a solid light or a flashing light, the colors and light condition designed to correspond to the words of the window advisory systems; (i) a second side light advisory system located on the passenger side of the vehicle, the advisory system having a series of selected lights which will light a certain color and either remain a solid light or a flashing light, the colors and light condition designed to correspond to the words of the window advisory systems; (j) the words of the window advisory systems and lights of the light advisory systems connected to the braking system and to the turn signal system of the vehicle and controlled by a computer so that the correct words will illuminate and the light color and sequence will be displayed when the driver presses on the brake, activates the turn signal, or if the vehicle is stopped; and (k) an activating panel on the dashboard with buttons corresponding to the words of the window advisory systems and light sequence of the light advisory systems.

Defined more broadly, the present invention is a vehicle advisory system, the vehicle having a front window, a rear window, side windows, a front bumper and grill, a rear lid, a braking system, a turn signal system and tires, the vehicle advisory system comprising: (a) a front window advisory system embedded into the front window, the advisory system having a multiplicity of advisory words, with the advisory words readable from the front of the vehicle so that drivers of oncoming traffic can read them; (b) a rear window advisory system embedded into the rear window, the advisory system having a multiplicity of advisory words, with the advisory words readable from the rear of the vehicle so that drivers of vehicles behind the vehicle can read them; (c) a first side window advisory system embedded into a side window on the driver's side of the vehicle, the advisory system having a multiplicity of advisory words, with the advisory words readable from outside of the vehicle on the driver's side of the vehicle; (d) a second side window advisory system embedded into a side window on the passenger side of the vehicle, the advisory system having a multiplicity of advisory words, with the advisory words readable from outside of the vehicle on the passenger side of the vehicle; (e) a front light advisory system located in the front of the vehicle, the advisory system having a series of selected lights which will light a certain color and either remain a solid light or a flashing light, the colors and light condition designed to correspond to the words of the window advisory systems; (f) a rear light advisory system located on the rear of the vehicle, the advisory system having a series of selected lights which will light a certain color and either remain a solid light or a flashing light, the colors and light condition designed to correspond to the words of the window advisory systems; (g) a first side light advisory system located on the driver's side of the vehicle, the advisory system having a series of selected lights which will light a certain color and either remain a solid light or a flashing light, the colors and light condition designed to correspond to the words of the window advisory systems; (h) a second side light advisory system located on the passenger side of the vehicle, the advisory system having a series of selected lights which will light a certain color and either remain a solid light or a flashing light, the colors and light condition designed to correspond to the words of the window advisory systems; and (i) the words of the window advisory systems and lights of the light advisory systems connected to the braking system and to the turn signal system of the vehicle and controlled by a computer so that the correct words will illuminate and the light color and sequence will be displayed when the driver presses on the brake, activates the turn signal, or if the vehicle is stopped.

Defined even more broadly, the present invention is a vehicle advisory system, the vehicle having a front window, a rear window, side windows, a front bumper and grill, a rear lid, a braking system and tires, the vehicle advisory system comprising: (a) a front window advisory system embedded into the front window, the advisory system having a multiplicity of advisory words, with the advisory words readable from the front of the vehicle so that drivers of oncoming traffic can read them; (b) a rear window advisory system embedded into the rear window, the advisory system having a multiplicity of advisory words, with the advisory words readable from the rear of the vehicle so that drivers of vehicles behind the vehicle can read (c) a rear light advisory system located on the rear of the vehicle, the advisory system having a series of selected lights which will light a certain color and either remain a solid light or a flashing light, the colors and light condition designed to correspond to the words of the window advisory systems; (d) a first side light advisory system located on the driver's side of the vehicle, the advisory system having a series of selected lights which will light a certain color and either remain a solid light or a flashing light, the colors and light condition designed to correspond to the words of the window advisory systems; and (e) the words of the window advisory systems and lights of the light advisory systems electrically connected to the braking system and to the turn signal system of the vehicle and controlled by a computer so that the correct words and light color and sequence will be displayed when the driver presses on the brake, activates the turn signal, or if the vehicle is stopped.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A vehicle advisory system, the vehicle having a front window, a rear window, side windows, a front bumper and grill, a rear lid, a dashboard, a braking system, a turn signal system and tires, the vehicle advisory system comprising:
   a. a front window advisory system embedded into the front window, the advisory system having a multiplicity of words which are STOP, HELP, SLOWING DOWN, LEFT TURN, RIGHT TURN, REVERSE and U-TURN, with the words readable from the front of the vehicle so that drivers of oncoming traffic can read them;
   b. a rear window advisory system embedded into the rear window, the advisory system having a multiplicity of words which are STOP, HELP, SLOWING DOWN, LEFT TURN, RIGHT TURN, REVERSE, U-TURN, DO NOT TAILGATE, KEEP DISTANCE, with the words readable from the rear of the vehicle so that drivers of vehicles behind the vehicle can read them;
   c. a first side window advisory system embedded into a side window on the driver's side of the vehicle, the advisory system having a multiplicity of words which are STOP, HELP, SLOWING DOWN, LEFT TURN, RIGHT TURN, REVERSE and U-TURN, with the words readable from outside of the vehicle on the driver's side of the vehicle;
   d. a second side window advisory system embedded into a side window on the passenger side of the vehicle, the advisory system having a multiplicity of words which are STOP, HELP, SLOWING DOWN, LEFT TURN, RIGHT TURN, REVERSE and U-TURN, with the words readable from outside of the vehicle on the passenger side of the vehicle;
   e. an interior window advisory system embedded on the interior of the front window; the advisory system having a multiplicity of words which are STOP, HELP, SLOWING DOWN, LEFT TURN, RIGHT TURN, REVERSE and U-TURN, with the words readable by passengers inside the vehicle;
   f. a front light advisory system located in the front of the vehicle beneath the grill and above the front bumper, the advisory system having a series of selected lights which will light a certain color and either remain a solid light or a flashing light, the colors and light condition designed to correspond to the words of the window advisory systems;
   g. a rear light advisory system located on the rear of the vehicle above the driver's license plate, the advisory system having a series of selected lights which will light a certain color and either remain a solid light or a flashing light, the colors and light condition designed to correspond to the words of the window advisory systems;
   h. a first side light advisory system located on a door on the driver's side of the vehicle, the advisory system having a series of selected lights which will light a certain color and either remain a solid light or a flashing light, the colors and light condition designed to correspond to the words of the window advisory systems;
   i. a second side light advisory system located on a door on the passenger side of the vehicle, the advisory system having a series of selected lights which will light a certain color and either remain a solid light or a flashing light, the colors and light condition designed to correspond to the words of the window advisory systems;
   j. the words of the window advisory systems and lights of the light advisory systems electrically connected to the braking system and to the turn signal system of the vehicle and controlled by a computer so that the correct words will illuminate and the light color and sequence will be displayed when the driver presses on the brake, activates the turn signal, or if the vehicle is stopped; and
   k. an activating panel on the dashboard with buttons corresponding to the words of the window advisory systems and light sequence of the light advisory systems.

2. The invention in accordance with claim 1, further comprising a multiplicity of bright dots painted on the tires.

3. The invention in accordance with claim 1, further comprising a multiplicity of radial lines painted on a tire and lines painted across the tire treads.

4. The invention in accordance with claim 1, wherein the words of the window advisory systems are backlit.

5. The invention in accordance with claim 1, further comprising a solar panel on the vehicle and connected to the vehicle battery.

6. A vehicle advisory system, the vehicle having a front window, a rear window, side windows, a front bumper and grill, a rear lid, a dashboard, a braking system, a turn signal system and tires, the vehicle advisory system comprising:
   a. a front window advisory system embedded into the front window, the advisory system having a multiplicity of advisory words, with the advisory words readable from the front of the vehicle so that drivers of oncoming traffic can read them;
   b. a rear window advisory system embedded into the rear window, the advisory system having a multiplicity of advisory words, with the advisory words readable from the rear of the vehicle so that drivers of vehicles behind the vehicle can read them;
   c. a first side window advisory system embedded into a side window on the driver's side of the vehicle, the advisory system having a multiplicity of advisory words, with the advisory words readable from outside of the vehicle on the driver's side of the vehicle;
   d. a second side window advisory system embedded into a side window on the passenger side of the vehicle, the advisory system having a multiplicity of advisory words, with the advisory words readable from outside of the vehicle on the passenger side of the vehicle;
   e. an interior window advisory system embedded on the interior of the front window; the advisory system having a multiplicity of advisory words, with the advisory words readable by passengers inside the vehicle;
   f. a front light advisory system located in the front of the vehicle, the advisory system having a series of selected lights which will light a certain color and either remain a solid light or a flashing light, the colors and light condition designed to correspond to the words of the window advisory systems;
   g. a rear light advisory system located on the rear of the vehicle, the advisory system having a series of selected lights which will light a certain color and either remain a solid light or a flashing light, the colors and light condition designed to correspond to the words of the window advisory systems;
   h. a first side light advisory system located on the driver's side of the vehicle, the advisory system having a series of selected lights which will light a certain color and either remain a solid light or a flashing light, the colors and light condition designed to correspond to the words of the window advisory systems;
   i. a second side light advisory system located on the passenger side of the vehicle, the advisory system having a series of selected lights which will light a certain color and either remain a solid light or a flashing light, the colors and light condition designed to correspond to the words of the window advisory systems;
   j. the words of the window advisory systems and lights of the light advisory systems connected to the braking system and to the turn signal system of the vehicle and controlled by a computer so that the correct words will illuminate and the light color and sequence will be displayed when the driver presses on the brake, activates the turn signal, or if the vehicle is stopped; and
   k. an activating panel on the dashboard with buttons corresponding to the words of the window advisory systems and light sequence of the light advisory systems.

7. The invention in accordance with claim 6, further comprising a multiplicity of bright dots painted on the tires.

8. The invention in accordance with claim 6, further comprising a multiplicity of radial lines painted on the tires and lines painted across the tire treads.

9. The invention in accordance with claim 6, further comprising a solar panel on the vehicle and connected to the vehicle battery.

10. The invention in accordance with claim 6, wherein the words of the window advisory systems are backlit.

11. A vehicle advisory system, the vehicle having a front window, a rear window, side windows, a front bumper and grill, a rear lid, a braking system, a turn signal system and tires, the vehicle advisory system comprising:
   a. a front window advisory system embedded into the front window, the advisory system having a multiplicity of advisory words, with the advisory words readable from the front of the vehicle so that drivers of oncoming traffic can read them;
   b. a rear window advisory system embedded into the rear window, the advisory system having a multiplicity of advisory words, with the advisory words readable from the rear of the vehicle so that drivers of vehicles behind the vehicle can read them;
   c. a first side window advisory system embedded into a side window on the driver's side of the vehicle, the advisory system having a multiplicity of advisory words, with the advisory words readable from outside of the vehicle on the driver's side of the vehicle;
   d. a second side window advisory system embedded into a side window on the passenger side of the vehicle, the advisory system having a multiplicity of advisory words, with the advisory words readable from outside of the vehicle on the passenger side of the vehicle;
   e. a front light advisory system located in the front of the vehicle, the advisory system having a series of selected lights which will light a certain color and either remain a solid light or a flashing light, the colors and light condition designed to correspond to the words of the window advisory systems;
   f. a rear light advisory system located on the rear of the vehicle, the advisory system having a series of selected lights which will light a certain color and either remain a solid light or a flashing light, the colors and light condition designed to correspond to the words of the window advisory systems;
   g. a first side light advisory system located on the driver's side of the vehicle, the advisory system having a series of selected lights which will light a certain color and either remain a solid light or a flashing light, the colors and light condition designed to correspond to the words of the window advisory systems;
   h. a second side light advisory system located on the passenger side of the vehicle, the advisory system having a series of selected lights which will light a certain color and either remain a solid light or a flashing light, the colors and light condition designed to correspond to the words of the window advisory systems; and
   i. the words of the window advisory systems and lights of the light advisory systems connected to the braking system and to the turn signal system of the vehicle and controlled by a computer so that the correct words will illuminate and the light color and sequence will be displayed when the driver presses on the brake, activates the turn signal, or if the vehicle is stopped.

12. The invention in accordance with claim 11, further comprising a multiplicity of bright dots painted on the tires.

13. The invention in accordance with claim 11, further comprising a multiplicity of radial lines painted on the tires and lines painted across the tire treads.

14. The invention in accordance with claim 11, further comprising a solar panel on the vehicle and connected to the vehicle battery.

15. The invention in accordance with claim 11, wherein the words of the window advisory systems are backlit.

16. A vehicle advisory system, the vehicle having a front window, a rear window, side windows, a front bumper and grill, a rear lid, a braking system and tires, the vehicle advisory system comprising:
   a. a front window advisory system embedded into the front window, the advisory system having a multiplicity of advisory words, with the advisory words readable from the front of the vehicle so that drivers of oncoming traffic can read them;
   b. a rear window advisory system embedded into the rear window, the advisory system having a multiplicity of advisory words, with the advisory words readable from the rear of the vehicle so that drivers of vehicles behind the vehicle can read
   c. a rear light advisory system located on the rear of the vehicle, the advisory system having a series of selected lights which will light a certain color and either remain a solid light or a flashing light, the colors and light condition designed to correspond to the words of the window advisory systems;
   d. a first side light advisory system located on the driver's side of the vehicle, the advisory system having a series of selected lights which will light a certain color and either remain a solid light or a flashing light, the colors and light condition designed to correspond to the words of the window advisory systems; and
   e. the words of the window advisory systems and lights of the light advisory systems electrically connected to the braking system and to the turn signal system of the vehicle and controlled by a computer so that the correct words will illuminate and the light color and sequence will be displayed when the driver presses on the brake, activates the turn signal, or if the vehicle is stopped.

17. The invention in accordance with claim 16, further comprising a multiplicity of bright dots painted on the tires.

18. The invention in accordance with claim 16, further comprising a multiplicity of radial lines painted on the tires and lines painted across the tire treads.

19. The invention in accordance with claim 16, further comprising a solar panel on the vehicle and connected to the vehicle battery.

20. The invention in accordance with claim 16, wherein the words of the window advisory system are backlit.

* * * * *